US011257232B2

(12) United States Patent
Fujigaki et al.

(10) Patent No.: US 11,257,232 B2
(45) Date of Patent: Feb. 22, 2022

(54) THREE-DIMENSIONAL MEASUREMENT METHOD USING FEATURE AMOUNTS AND DEVICE USING THE METHOD

(71) Applicant: UNIVERSITY OF FUKUI, Fukui (JP)

(72) Inventors: Motoharu Fujigaki, Fukui (JP); Yuichi Akatsuka, Fukui (JP); Daishi Takata, Fukui (JP)

(73) Assignee: UNIVERSITY OF FUKUI, Fukui (JP)

( * ) Notice: Subject to any disclaimer, the term of this patent is extended or adjusted under 35 U.S.C. 154(b) by 90 days.

(21) Appl. No.: 16/612,102

(22) PCT Filed: May 7, 2018

(86) PCT No.: PCT/JP2018/017592
§ 371 (c)(1),
(2) Date: Nov. 9, 2019

(87) PCT Pub. No.: WO2018/207720
PCT Pub. Date: Nov. 15, 2018

(65) Prior Publication Data
US 2021/0158551 A1    May 27, 2021

(30) Foreign Application Priority Data

May 8, 2017    (JP) .............................. JP2017-092144

(51) Int. Cl.
*G06T 7/521* (2017.01)
*G06T 7/55* (2017.01)
(Continued)

(52) U.S. Cl.
CPC ................ *G06T 7/521* (2017.01); *G06T 7/55* (2017.01); *G06T 7/74* (2017.01); *H04N 5/247* (2013.01);
(Continued)

(58) Field of Classification Search
CPC .. G06T 7/521; G06T 7/74; G06T 7/55; G06T 2207/10152; G06T 2207/30204; H04N 5/247
(Continued)

(56) References Cited

U.S. PATENT DOCUMENTS

| 5,038,258 | A | 8/1991 | Koch et al. |
| 5,615,003 | A * | 3/1997 | Hermary ............... G01B 11/245 250/559.23 |

(Continued)

FOREIGN PATENT DOCUMENTS

| CN | 101509764 | 8/2009 |
| CN | 102721376 | 10/2012 |

(Continued)

OTHER PUBLICATIONS

A. Masaya, M. Fujigaki, R. Murakami and Y. Morimoto, "High-accuracy shape measurement by whole-space tabulation board applied to electronic packaging," Proceedings of SICE Annual Conference 2010, Taipei, Taiwan, 2010, pp. 1717-1721. (Year: 2010).*

(Continued)

*Primary Examiner* — Marnie A Matt
(74) *Attorney, Agent, or Firm* — Staas & Halsey LLP

(57) ABSTRACT

The relationship between space coordinates and a plurality of feature amounts gained from at least a pattern or a change in the pattern that has been projected from a plurality of projection units is found in advance, and the relationship between the feature amounts and the space coordinates is used in order to find the space coordinates of the surface of an object from the feature amounts that have been gained from a pattern or a change in the pattern projected from the plurality of projection units onto the surface of the object.

20 Claims, 16 Drawing Sheets

(51) Int. Cl.
    *G06T 7/73*    (2017.01)
    *H04N 5/247*    (2006.01)

(52) U.S. Cl.
    CPC .............. *G06T 2207/10152* (2013.01); *G06T 2207/30204* (2013.01)

(58) Field of Classification Search
    USPC ........................................................ 348/136
    See application file for complete search history.

(56) References Cited

U.S. PATENT DOCUMENTS

| | | | | |
|---|---|---|---|---|
| 5,648,851 | A * | 7/1997 | Kellner | G01B 11/002 250/237 R |
| 6,421,629 | B1 * | 7/2002 | Ishiyama | G01B 11/255 702/159 |
| 9,354,046 | B2 * | 5/2016 | Tohara | G06T 7/13 |
| 2003/0078694 | A1 * | 4/2003 | Watanabe | G05B 19/4202 700/245 |
| 2004/0264764 | A1 | 12/2004 | Kochi et al. | |
| 2010/0142798 | A1 * | 6/2010 | Weston | G06T 7/521 382/141 |
| 2012/0236318 | A1 | 9/2012 | Aoki | |
| 2015/0015701 | A1 | 1/2015 | Yu | |
| 2015/0130906 | A1 * | 5/2015 | Bridges | G05B 19/401 348/46 |
| 2015/0160005 | A1 | 6/2015 | Iwai | |
| 2015/0181191 | A1 | 6/2015 | Iwai et al. | |
| 2019/0234725 | A1 | 8/2019 | Klimov et al. | |

FOREIGN PATENT DOCUMENTS

| | | |
|---|---|---|
| CN | 104380036 | 2/2015 |
| CN | 104380037 | 2/2015 |
| CN | 104903680 | 9/2015 |
| CN | 205679208 | 11/2016 |
| DE | 4308456 | 3/1993 |
| EP | 0385262 | 2/1990 |
| EP | 0689664 | 1/1996 |
| EP | 2508871 | 10/2012 |
| JP | 2001-12925 | 1/2001 |
| JP | 2001-108422 | 4/2001 |
| JP | 2008-190990 | 8/2008 |
| JP | 2008-281491 | 11/2008 |
| JP | 2011-242178 | 12/2011 |
| JP | 2012-189479 | 10/2012 |
| JP | 2013-160596 | 8/2013 |
| JP | 2014-59164 | 4/2014 |
| JP | 5854540 | 12/2015 |
| JP | 2016-128785 | 7/2016 |
| JP | 2016-128786 | 7/2016 |
| JP | 2016-170113 | 9/2016 |
| JP | 6035031 | 11/2016 |
| JP | 2017-40482 | 2/2017 |
| JP | 6308637 | 4/2018 |
| WO | 2015/006431 | 1/2015 |

OTHER PUBLICATIONS

International Search Report dated Jul. 10, 2018, in corresponding International Patent Application No. PCT/JP2018/017592.

Japanese Office Action dated Dec. 12, 2017 in corresponding Japanese Patent Application No. 2017-092144.

Kusunoki et al., "Review on method for creating table in three-dimensional inspection technique by feature-quantity type whole-space tabulation method", Proceedings of the Japan Society for Precision Engineering: Lecture proceeding of conference of JSPE, Mar. 15, 2018 pp. 373,374.

Motoharu Fujigaki, Key Note Speech, "Three-Dementional Measurement Using Feature-Quantity Type Whole-Space Tabulation Method", 2019, pp. 785-786.

Zhang Xuping et al., "Large-Scale Three-Dimensional Stereo Vision Geometric Measurement System", Acta Optica Sinica, vol. 32, No. 3, Mar. 2012, 8 pages.

Ding Shaowen et al., "Overview of Non-Contact 3D Reconstruction Measurement Methods", Laser & Optoelectronics Progress, 2017, 15 pages.

Xueyong Li et al., "An image acquisition method for raised characters based on laser vision technology", Optics and Lasers in Engineering, 2013, pp. 148-158.

Chinese Office Action dated Oct. 30, 2020 from Chinese Application No. 201880030908.3, 16 pgs.

* cited by examiner

CROSS-SECTIONAL FORM (TOP VIEW)

(SIDE VIEW)

(TOP VIEW)

(FRONT VIEW)　　　　　　　　(SIDE VIEW)

(TOP VIEW)

(FRONT VIEW)　　　　　　　　(SIDE VIEW)

THREE-DIMENSIONAL MEASUREMENT METHOD USING FEATURE AMOUNTS AND DEVICE USING THE METHOD

CROSS-REFERENCE TO RELATED APPLICATIONS

This application is a U.S. National Stage Application which claims the benefit under 35 U.S.C. § 371 of International Patent Application No. PCT/JP2018/017592 filed on May 7, 2018, which claims foreign priority benefit under 35 U.S.C. § 119 of Japanese Patent Application No. 2017-092144 filed on May 8, 2017 in the Japanese Intellectual Property Office, the contents of both of which are incorporated herein by reference.

TECHNICAL FIELD

The present invention relates to a three-dimensional measurement method using feature amounts and a device using the method.

BACKGROUND ART

Various studies have been carried out domestically and internationally since the 1980's on the measurement of three-dimensional shapes using a camera. In the field of robot vision, a method that does not require calibration of the cameras has been proposed. A method for restoring the three-dimensional shape from images taken in a great number of directions has also been proposed; however, the shapes of smooth surfaces cannot be measured, and the analysis takes a long time due to the correspondence with the feature points of the border portions or the like on the images.

In recent years, a method for detecting and measuring the locations and the shapes of obstacles or protrusions with high precision in real time has been required for the decontamination activity inside a nuclear reactor using a robot arm or a moving robot. In addition, it is necessary in disaster relief robots to measure the relationships between human bodies and obstacles with high precision in order to protect the survivors.

In the conventional stereo systems, however, the measurement precision lowers due to a shift in the location of a camera because many vibrations are caused by rough roads. It is indispensable to stabilize the optical system after calibration, and therefore, the conventional common practice does not allow zooming or focus adjustment.

Studies for a method for topological analysis of a projected fringe have been widely carried out as a method for measuring a three-dimensional shape with high precision when the shape includes a plane or a curved surface, wherein the three-dimensional measurement is carried out using an image of a fringe pattern that has been projected onto the surface of an object to be measured and taken from a direction that is different from the direction in which the fringe pattern has been projected onto the surface of the object to be measured.

Domestically, Takeda et. al. have proposed a phase analysis technique using Fourier transformation, and Yoshizawa et. al. have developed a practical three-dimensional measurement device. Internationally, Song Zhang et. al. have been vigorously proceeding on a study of ultra-high-speed three-dimensional measurement using a digital micromirror device (DMD) in the United States. As a recent trend, attention has been centered on an increase in the speed of the measurement of a three-dimensional shape. However, the use of a three-dimensional measurement device as described above has hardly been considered in the outdoors or in an environment where there are many vibrations.

In addition, there are few studies of a calibration method for enhancing the precision in measurement. In particular, a three-dimensional measurement technique where a systematic error does not take place at all has not been proposed domestically or internationally except by the present inventors. Furthermore, a study of three-dimensional measurement that is possible by calibrating only the projection unit has not been found either domestically or internationally.

The inventors have so far proposed a technique for converting the total space data to a table (see PTL 1) where a systematic error does not occur as shown in FIG. 1, and have developed a basic technology and have carried out many application studies. The fringe projection technique provides the relationship of one-on-one correspondence between the phases of the projected fringe and the three-dimensional coordinates. By using this relationship, a table of phase values and three-dimensional coordinates is created for each pixel of a camera, which completely prevents a systematic error such as lens distortion from occurring, and thus makes three-dimensional measurement without warping and with high precision possible.

CITATIONS LIST

Patent Literature

PTL 1: Japanese Unexamined Patent Publication 2008-281491
PTL 2: Japanese Unexamined Patent Publication 2001-108422
PTL 3: Japanese Unexamined Patent Publication 2017-40482
PTL 4: Japanese Unexamined Patent Publication 2012-189479

SUMMARY OF THE INVENTION

Technical Problem

In the conventional three-dimensional measurement methods including the method disclosed in PTL 1, calibration is indispensable in the state where the camera and the projector are totally integrated. Therefore, it is necessary to stabilize the three-dimensional measurement unit that includes a camera, which makes the size of the device large, and thus, it is difficult to attach the unit to a robot hand, a moving robot, an automated carrier vehicle and the like. In addition, recalibration should be done when the focus of the lens for taking an image has been adjusted or the view angle has been adjusted, which causes a problem in that maintenance is difficult.

An object of the present invention is to solve the above-described problem and provide a three-dimensional measurement method using a set of three or more feature amounts and a device using the method.

Solution to Problem

According to one embodiment of the present invention, a measurement method for finding the space coordinates of the surface of an object to be measured is provided with:

the step of preparing a plurality of sets of three or more feature amounts and projecting a pattern or a change in the pattern onto the surface of an object to be measured from a plurality of locations that are arranged in such a manner that the relationship of the one-on-one correspondence is achieved between the respective sets of three or more feature amounts and the respective space coordinates within a measurement region or within a partial region of the measurement region;

the step of taking an image of the pattern or the change in the pattern that has been projected onto the surface of the object to be measured; and the step of using the relationship between the sets of three or more feature amounts and the space coordinates that has been found in advance by using a reference object in order to find the space coordinates from the sets of three or more feature amounts that have been gained on the basis of the image that has been taken.

In the above-described embodiment, the relationship between the respective sets of three or more feature amounts and the respective space coordinates is shown in a table so that the space coordinates of the surface of the object to be measured can be found on the basis of the values shown in the table at the time of measurement of the space coordinates of the surface of the object to be measured.

In addition, in the above-described embodiment, part of the relationship between the respective sets of three or more feature amounts and the respective space coordinates is shown in a table so that the space coordinates of the surface of the object to be measured can be found through interpolation by using the values shown in the table at the time of measurement of the space coordinates of the surface of the object to be measured.

In the above-described embodiment, the space coordinates of the surface of the object to be measured are found from the sets of a plurality of feature amounts that are simultaneously obtained by using a plurality of wavelengths of light for the projection from the plurality of locations.

In the above-described embodiment, the space coordinates of the surface of the object to be measured are found through the projection from the plurality of locations that are arranged along a line.

In the embodiment of the present invention, the relationship between the sets of three or more feature amounts and the respective space coordinates is found by projecting a pattern or a change in the pattern onto the surface of the reference object from a plurality of locations while changing the distances between the plurality of locations and the reference object with a plurality of intervals.

In the above-described embodiment, a plurality of sets of three or more feature amounts is prepared and the relationship between the sets of three or more feature amounts and the respective space coordinates is found by projecting a pattern or a change in the pattern onto the surface of the reference object from a plurality of locations that is arranged in such a manner that the relationship of the one-on-one correspondence is achieved between the respective sets of three or more feature amounts and the respective space coordinates within a measurement region or within a partial region of the measurement region while changing the distances between the plurality of locations and the reference object with a plurality of intervals.

In the above-described embodiment, a fringe pattern or a mark is fixed on the surface of the reference object.

In the above-described embodiment, a plurality of wavelengths of light is used for the projection from the plurality of locations.

In the above-described embodiment, the plurality of locations is arranged along a line.

According to another embodiment of the present invention, a measurement device for finding the space coordinates of the surface of an object to be measured is provided with:

a projection unit that includes a plurality of sets of three or more feature amounts and is configured to project a pattern or a change in the pattern onto the surface of an object to be measured from a plurality of locations that is arranged in such a manner that the relationship of the one-on-one correspondence is achieved between the respective sets of three or more feature amounts and the respective space coordinates within a measurement region or within a partial region of the measurement region;

an imaging unit that is configured to take an image of the pattern or a change in the pattern that has been projected onto the surface of the object to be measured;

a memory unit that is configured to store the relationship between the sets of three or more feature amounts and the space coordinates; and a space coordinates acquisition unit that is configured to use the relationship between the sets of three or more feature amounts and the space coordinates that have been stored in the above-described memory unit in order to find the space coordinates from the sets of three or more feature amounts that have been gained on the basis of the image that has been taken.

In the above-described embodiment, the relationship between the respective sets of three or more feature amounts and the respective space coordinates is shown in a table, which is thus stored in the above-described memory unit, so that the space coordinates of the surface of the object to be measured can be found on the basis of the values shown in the table at the time of measurement of the space coordinates of the surface of the object to be measured.

In the above-described embodiment, part of the relationship between the respective sets of three or more feature amounts and the respective space coordinates is shown in a table, which is thus stored in the above-described memory unit, so that the space coordinates of the surface of the object to be measured can be found through interpolation by using the values shown in the table at the time of measurement of the space coordinates of the surface of the object to be measured.

In the above-described embodiment, the sets of a plurality of feature amounts are simultaneously obtained by using different wavelengths of light for the projection from the plurality of locations of the above-described projection unit.

In the above-described embodiment, the space coordinates of the surface of the object to be measured are found through the projection from the plurality of locations that are arranged along a line.

In the embodiment of the present invention, the measurement device for finding the relationship between sets of three or more feature amounts and the respective space coordinates is configured to find the relationship between the sets of three or more feature amounts and the respective space coordinates by projecting a pattern or a change in the pattern onto the surface of the reference object from a plurality of locations of the projection unit while changing the distances between the projection unit and the reference object with a plurality of intervals.

In the embodiment of the present invention, the relationship between the sets of three or more feature amounts and the respective space coordinates is found by using a second projection unit having the same configuration as the above-described projection unit and projecting a pattern or a change in the pattern onto the surface of the reference object from the second projection unit while changing the distance between the second projection unit and the reference object with a plurality of intervals.

In the embodiment of the present invention, a measurement device is provided with:

a plurality of projection units that includes a plurality of sets of three or more feature amounts and is configured to project a pattern or a change in the pattern from a plurality of locations that are arranged in such a manner that the relationship of the one-on-one correspondence is achieved between the respective sets of three or more feature amounts and the respective space coordinates within the measurement region or within a partial region of the measurement region;

a change unit that is configured to change the distances between the plurality of projection units and the reference object; and an imaging unit that is configured to take an image of the pattern or a change in the pattern while changing the distances between the plurality of projection units and the reference object with a plurality of intervals, wherein the measurement device is configured to find the relationship between the sets of three or more feature amounts and the respective space coordinates on the basis of an image taken by the imaging unit and the distances between the plurality of projection units and the reference object.

In the above-described embodiment, the relationship between the sets of three or more feature amounts and the space coordinates is found by fixing a fringe pattern or a mark on the surface of the reference object.

In the above-described embodiment, the relationship between the sets of three or more feature amounts and the space coordinates is found through the characteristics where the plurality of locations is arranged along a line.

In the above-described embodiment, the above-described projection units are integrated as a single projection module, and the above-described imaging unit is made of a plurality of cameras in such a manner that the plurality of cameras is provided in the projection module.

Advantageous Effects of the Invention

The present invention can provide a three-dimensional measurement method using sets of three or more feature amounts and a device using the method.

BRIEF DESCRIPTION OF DRAWINGS

FIG. 3 is a diagram illustrating the state when the light source 5A has been turned on;

FIG. 4 is a diagram illustrating the state when the light source 5B has been turned on;

DESCRIPTION OF EMBODIMENTS

In the following, an embodiment of the present invention is described in reference to the drawings.

1. Description of Measurement Principles 1.1 Calibration

First, measurement principles according to the present invention are described. Here, two-dimensional coordinates (x, z) are found by using two feature amounts for the purpose of simplicity of the description. In reality, it is necessary to expand to three dimensions in order to find the space coordinates (x, y, z) in the three-dimensional space. However, three-dimensional space coordinates can be found in the same method for the two-dimension coordinates by making the number of projectors as described below three or more in order to make the number of feature amounts that are gained therefrom three or more.

Figure 1:
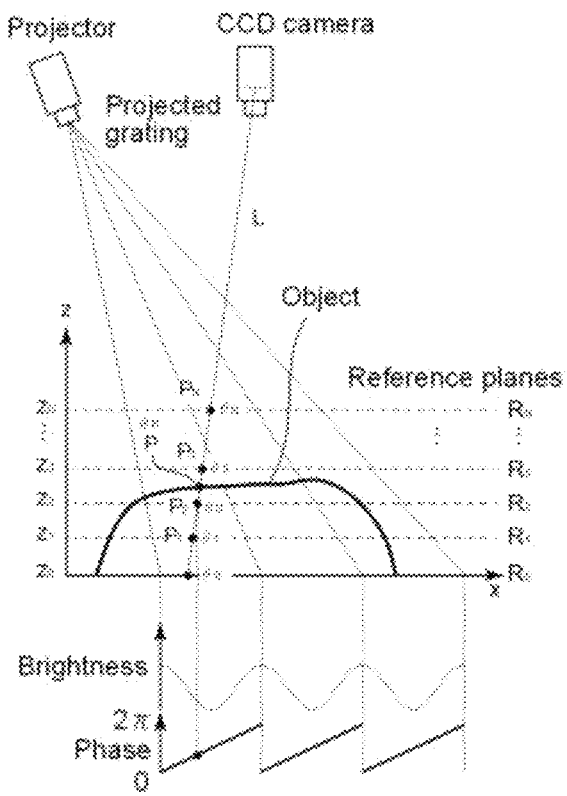
FIG. 1 is a diagram illustrating a technique for showing the total space in a table disclosed in PTL 1.
Figure 1:
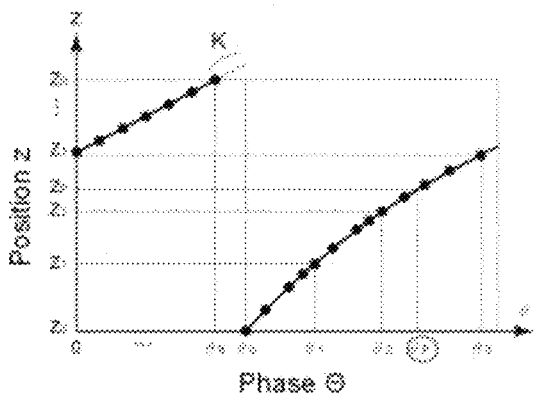
Figure 1:
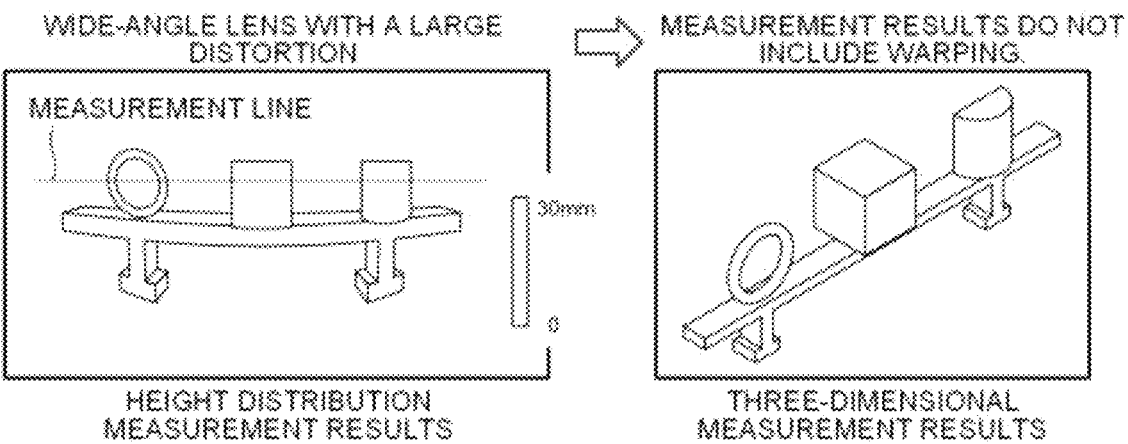
Figure 1:
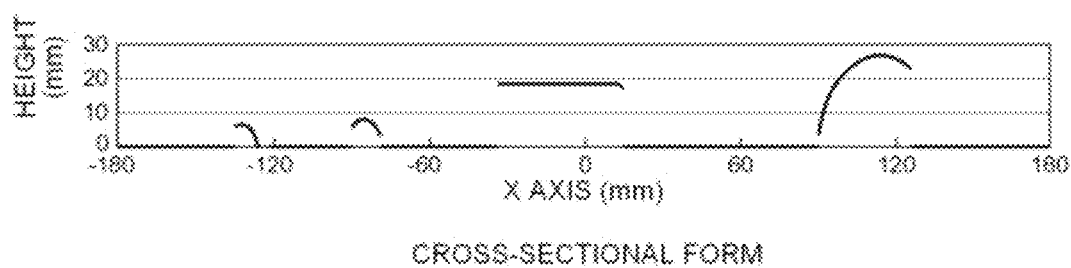
Figure 2:
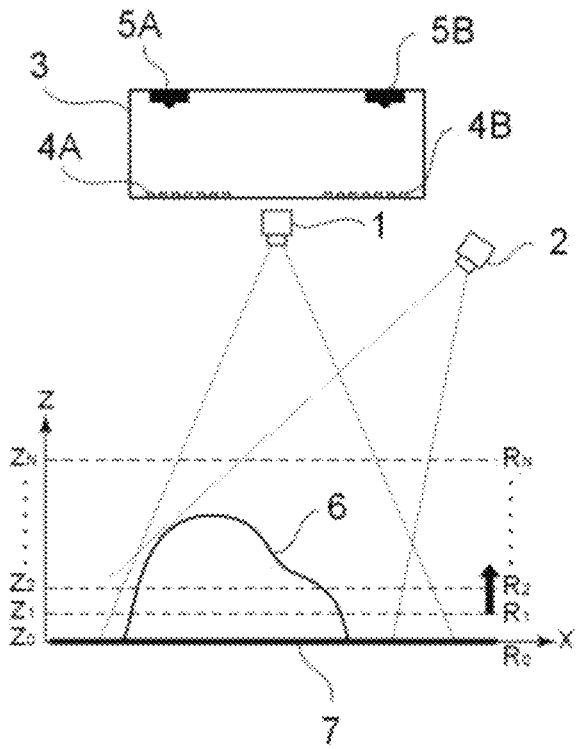
FIG. 2 is a diagram illustrating the configuration of the device.

FIG. 2 shows the configuration of the measurement device according to an embodiment of the present invention. A light source 5A with grating glass 4A and a light source 5B with grating glass 4B are fixed to a fringe projection unit 3. The fringe projection unit 3 is formed of a material through which light from the light sources transmits or is formed to be hollow. The light source 5A, the light source 5B, the grating glass 4A and the grating glass 4B are fixed to the fringe projection unit 3, and therefore, the relationship in the relative locations from among the light source 5A, the light source 5B, the grating glass 4A and the grating glass 4B does not change, or a change in the relationship of the relative locations is to such an extent that the effects on the measurement can be ignored. The combination of the light source 5A and the grating glass 4A functions as a projector. Likewise, the combination of the light source 5B and the grating glass 4B functions as a projector.

Figure 3:
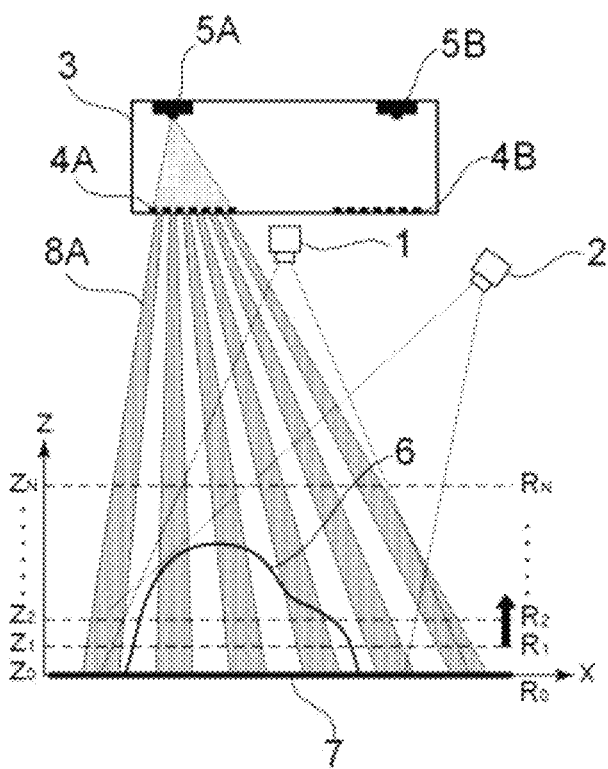

As shown in FIG. 3, the fringe pattern 8A of the grating glass 4A is projected onto a reference plane 7 and an object 6 (object to be measured) when the light source 5A is turned on.

Figure 4:
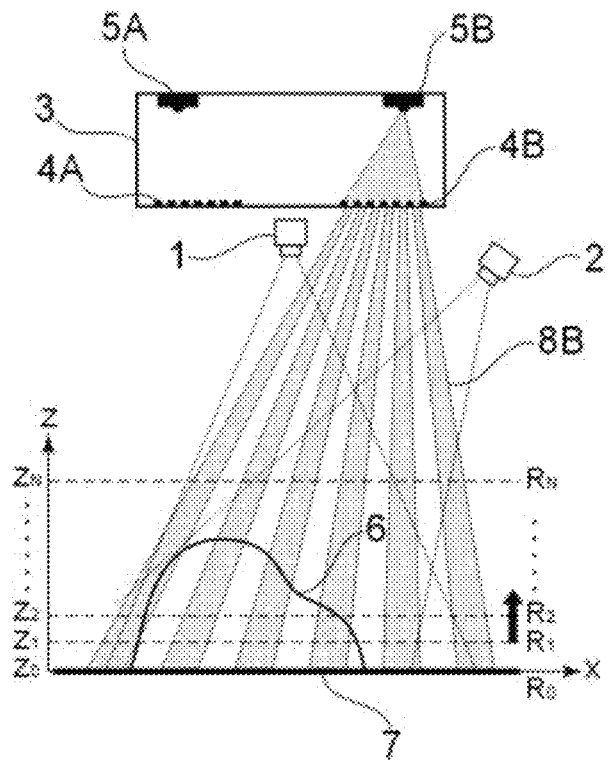

As shown in FIG. 4, the same can be applied to the light source 5B and the grating glass 4B, and the fringe pattern 8B of the grating glass 4B is projected onto the reference plane 7 and the object 6 (object to be measured) when the light source 5B is turned on.

The reference plane 7 is provided on a stage not shown in such a manner that the reference plane 7 can be translated by an arbitrary amount in the direction of the normal by moving the stage upwards or downwards. In addition, a fringe pattern indicating the x coordinates (or marks for scale) is provided in the reference plane. As described in PTL 2, it is also possible to use a display or the like to provide the reference plane 7. In addition, as described in PTL 3, a curved surface can be used instead of the reference plane 7.

Figure 5:
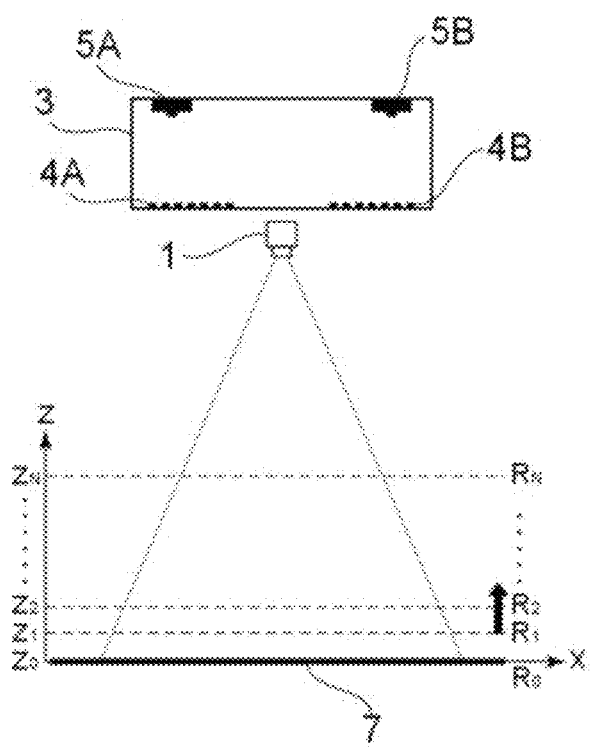
FIG. 5 is a diagram illustrating the calibration manner (taking an image of the fringe pattern fixed on the reference plane)

First, as shown in FIG. 5, the location of the fringe projection unit 3 and the arrangements of the camera 1 and the reference plane 7 are determined for installation before calibration. The camera 1 is a camera for taking an image for calibration. The camera 1 can also be used for the measurement of the object 6.

As shown in FIG. 5, the reference plane 7 is moved to the locations R0, R1, ... RN (z=z0, z1, ... zN, respectively) in such a manner that an image of the fringe pattern indicating the x coordinates ((x, y) coordinates in the case of three-dimensional coordinates) or the marks for scale in the reference plane 7 is taken in each location. Thus, the x coordinates ((x, y) coordinates in the case of three-dimensional coordinates) can be gained from the image taken by the camera 1 for each pixel of which the image has been taken.

Figure 6:
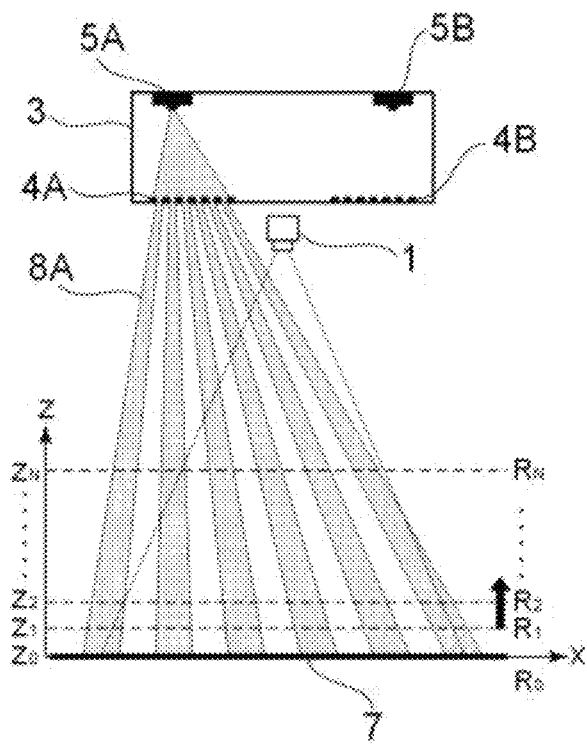
FIG. 6 is a diagram illustrating the calibration manner (in the case where the fringe pattern 8A is projected)
Figure 7:
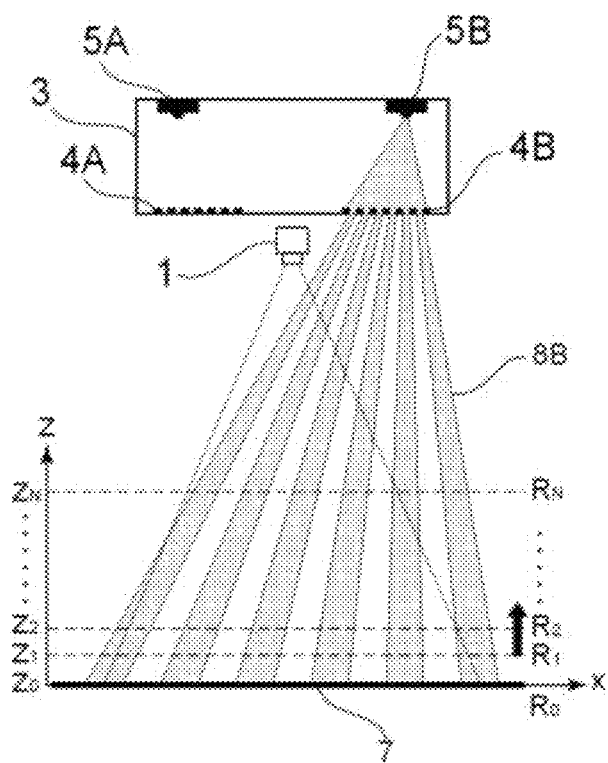
FIG. 7 is a diagram illustrating the calibration manner (in the case where the fringe pattern 8B is projected)

Next, as shown in FIG. 6, the light source 5A is turned on in order to project the fringe pattern 8A in the grating glass 4A onto the reference plane 7, and an image thereof is taken by the camera 1. Furthermore, as shown in FIG. 7, the light source 5B is turned on in order to project the fringe pattern 8B in the grating glass 4B onto the reference plane 7, and an image thereof is taken by the camera 1. At this time, as described in PTL 4, the phase of the projected fringe is shifted by switching the light source that is turned on from one location to another, and thus, the phase distribution can be found.

Figure 8:
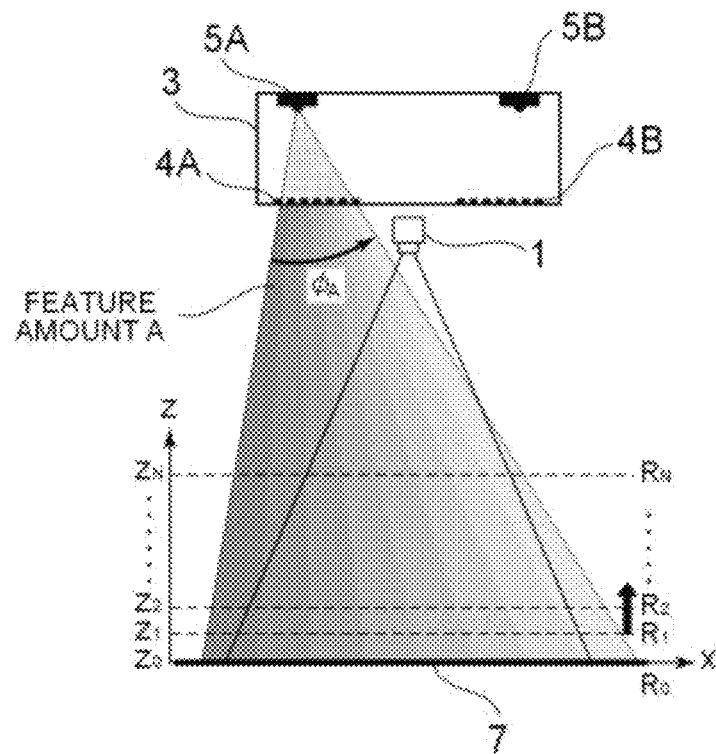
FIG. 8 is a diagram illustrating the distribution of feature amounts $\varphi_A$.
Figure 9:
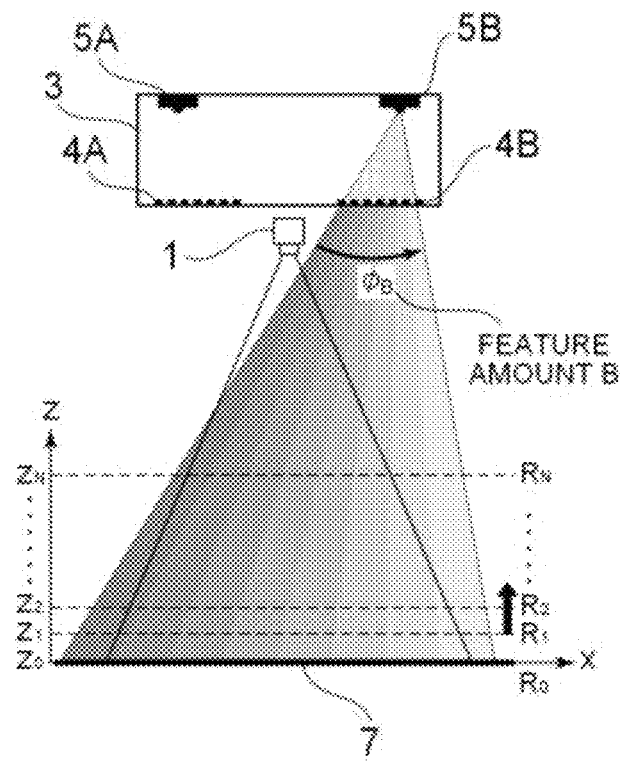
FIG. 9 is a diagram illustrating the distribution of feature amounts $\varphi_B$.

The distribution of the phase values $\varphi_A$ and $\varphi_B$ that have been made to continue are gained from the gained phase distribution by carrying out a process of phase connection. The phase values $\varphi_A$ and $\varphi_B$ that have been made to continue are feature amounts that are gained by using the fringe patterns 8A and 8B. Thus, as schematically shown in FIGS. 8 and 9, the distribution of the feature amount A ($\varphi_A$) and the feature amount B ($\varphi_B$) can be gained by using the fringe patterns 8A and 8B. This distribution can be acquired as a discrete distribution for each pixel for each location of the reference plane 7 on the basis of the image of the reference plane 7 taken by the camera 1 as described above. Here, in the case of a fringe projection method, the phase changes by 2· for each period of the fringe pattern, and therefore, the gained phase values are repeated for every 2·. However, information on the changes in the spacial phases can be used for the phase connection, or a plurality of projection fringes with different pitches can be used to make the phase connection possible by using the information on the combination thereof. By doing so, the repetition for every 2· is cancelled for the projection fringe, and thus, the phase values that have been made to continue (phase connected phase values) can be gained. The same can be applied to the case where a sampling moire method, a phase shift method or any of the other topological analysis techniques is used.

Figure 10:
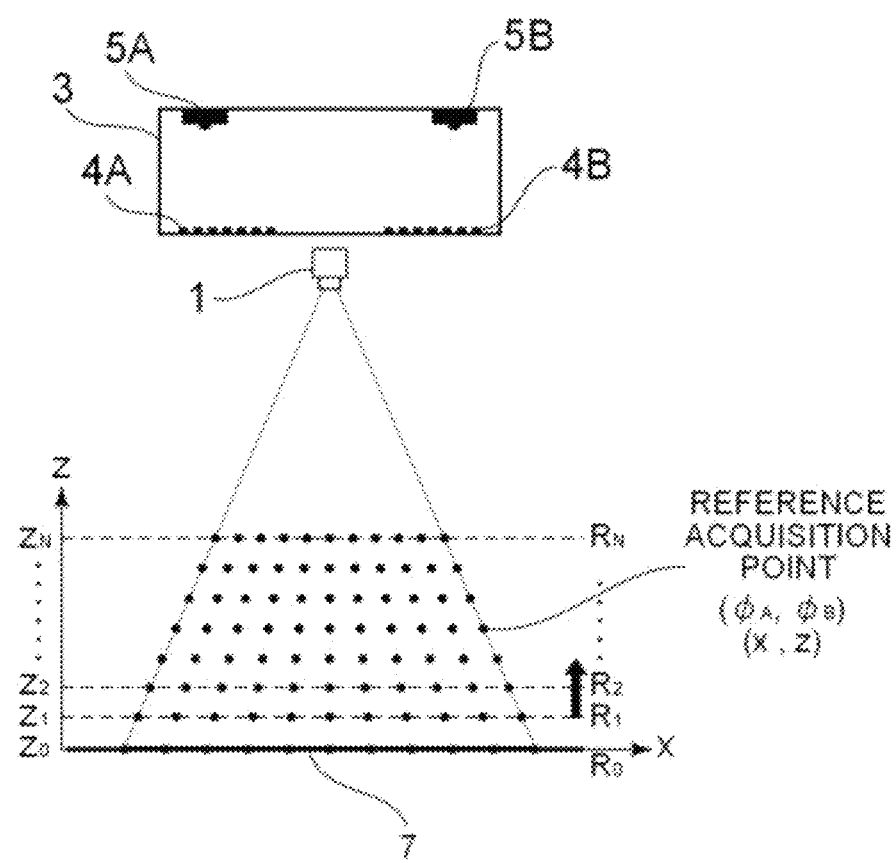
FIG. 10 is a diagram illustrating reference acquisition points.

By carrying out the above-described procedure, a set of feature amounts ($\varphi_A$, $\varphi_B$) and the coordinates (x, y) are respectively gained in the location of the reference acquisition points shown in FIG. 10. FIG. 10 schematically shows the reference acquisition points at discontinuous points. In reality, the reference acquisition points of which the number is the same as the pixels in camera 1 in the x direction and of which the number is the same as the number of gaps by which the reference plane 7 is moved in the z direction are gained, and therefore, the actually gained reference acquisition points are more concentrated than those shown in FIG. 10.

In addition, a liquid crystal projector or a projector using a digital micromirror device (DMD) can be used instead of the fringe projection mechanism shown herein so that a distribution of feature amounts can be created in the space in the same manner. Furthermore, in the case where a light cutting method such as the scanning with light that has passed through a slit is used, the amount of scanning with light that has passed through a slit (for example, the angle at which light is emitted through a slit) can be used as a feature amount.

As described above, not only a method for gaining a feature amount from the pattern that is projected from a projection unit but also a method for gaining a feature amount by changing the pattern in a plurality of ways such as a phase shift method or a grey code method or a technique for gaining a feature amount through a change in the pattern such as the above-described light cutting method can be applied as the present technique. In the case of a phase shift method, the gained phase value may be used as a feature amount, and in the case of a grey code method, the grey code value for dividing the space may be used as a feature amount. In addition, in a technique for using polarized light, the direction in which the light is polarized may be used as a feature amount.

1.2 Creation of Feature Amount-Coordinate Table

Figure 11:
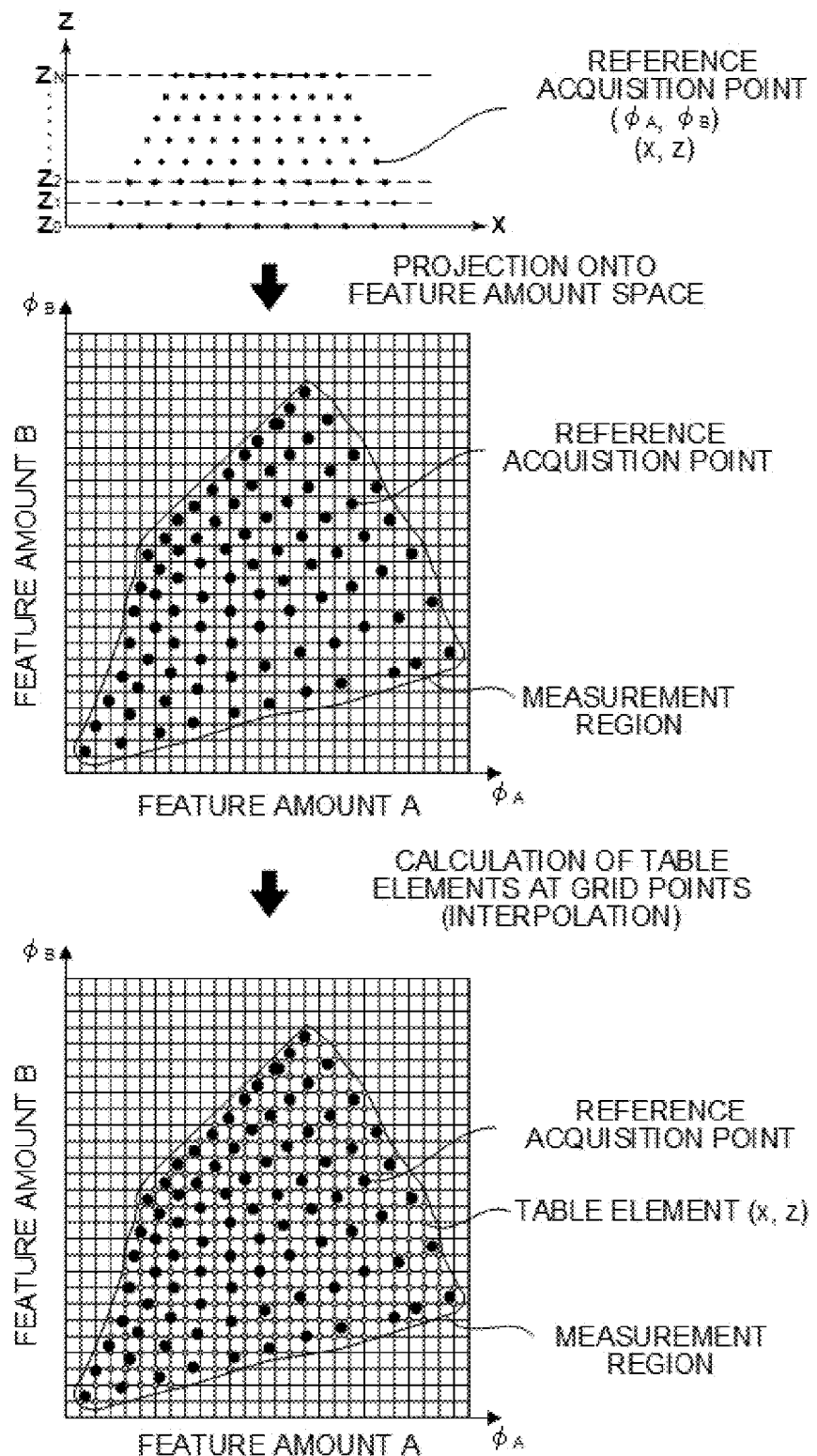
FIG. 11 is a diagram illustrating a procedure for preparing a feature amount-coordinate table.

Next, a procedure for creating a feature amount-coordinate table for finding coordinates (x, z) from a set of feature amounts A and B ($\varphi_A$, $\varphi_B$) is described. As shown in FIG. 11, first, the reference acquisition points that have been acquired as a discrete distribution for each pixel for each position of the reference plane 7 in accordance with the above-described calibration technique are projected onto a feature amount space. Here, the feature amount space is a space having the feature amounts A and B as the coordinate axes. A set of feature amounts ($\varphi_A$, $\varphi_B$) and coordinates (x, z) at each reference acquisition point are gained for each reference acquisition point, and therefore, projection onto the featured amount space is possible in such a state where coordinates (x, z) are gained for each of the projected reference acquisition points.

Next, the points at which the feature amounts A and B are made to be discrete are considered. FIG. 11 shows a case where the feature amounts are made to be discrete at equal intervals. These grid points are used as table elements so as to find the coordinate values of the elements through interpolation on the basis of the values of the coordinates (x, z) of a plurality of reference acquisition points in the proximity of the table elements. By doing this, the value of each element in the feature amount-coordinate table concerning the feature amounts A and B (data stored in each table element) can be found. At this time, the existence of reference acquisition points in the proximity makes the interpolation significant in the feature amount space, and therefore, the region where the reference acquisition points are concentrated to a certain extent is regarded as a measurement region.

Here, in reality, the space coordinates (x, y, z) in a three-dimensional space is found, and therefore, the expansion to a three-dimensional space is necessary. the number of projectors is made to be three or more, and the number of feature amounts that are gained therefrom is made to be three or more so that the feature amount-coordinate table can be created in the same manner. Each table element becomes three-dimensional space coordinates.

1.3 Acquisition of Three-Dimensional Coordinates of Object to be Measured

Next, a procedure for measuring the coordinates (x, z) of a point on the surface of an object 6 (object to be measured) is described. First, a camera 2 is installed in a location from which an image of an object to be measured can be taken. At this time, the camera 1 and the reference plane 7 are not necessary, and therefore may be removed.

Figure 12:
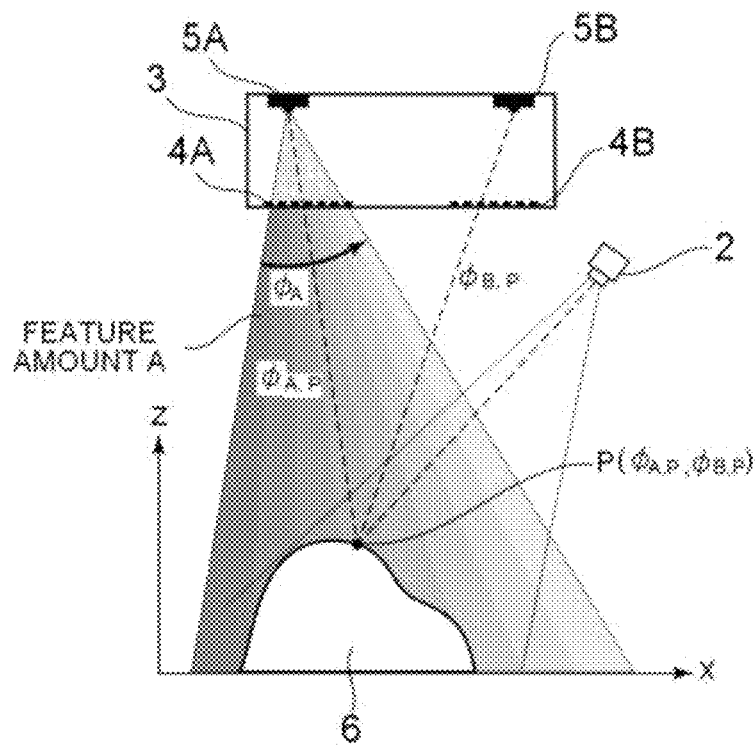
FIG. 12 is a diagram illustrating the projection of feature amounts A onto an object.
Figure 13:
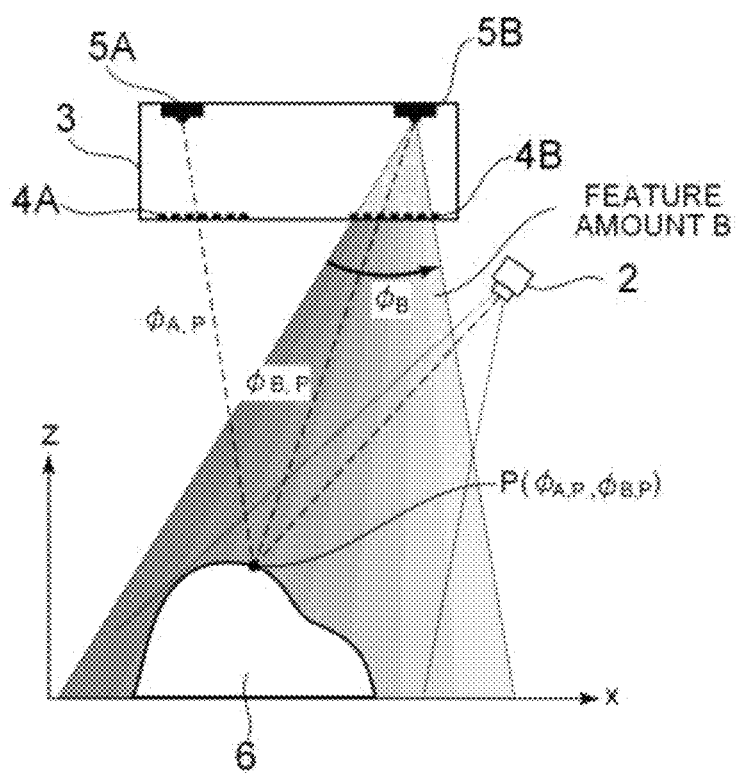
FIG. 13 is a diagram illustrating the projection of feature amounts B onto the object.

As described above concerning FIGS. 3 and 4, the light sources 5A and 5B can be turned on in order to project the fringe pattern 8A and the fringe pattern 8B in the grating glass 4A and grating glass 4B onto the surface of the object. In this case as well, as shown in FIGS. 12 and 13, the distribution of feature amounts A ($\varphi_A$) and feature amounts B ($\varphi_B$) can be considered to be respectively projected onto the surface of the object in the same manner as in the case of the projection of the reference plane 7.

Here, a point P on the object of which the image is taken by a certain pixel in the camera 2 is focused on. A certain feature amount A ($\varphi_{A, P}$) and feature amount B ($\varphi_{B, P}$) are projected onto the point P, and thus, a set of feature amounts ($\varphi_{A, P}$, $\varphi_{B, P}$) is gained in the corresponding one pixel in the camera 2. Likewise, a set of feature amounts that corresponds to each pixel can be gained for the other pixels for taking an image in the camera 2.

Figure 14:
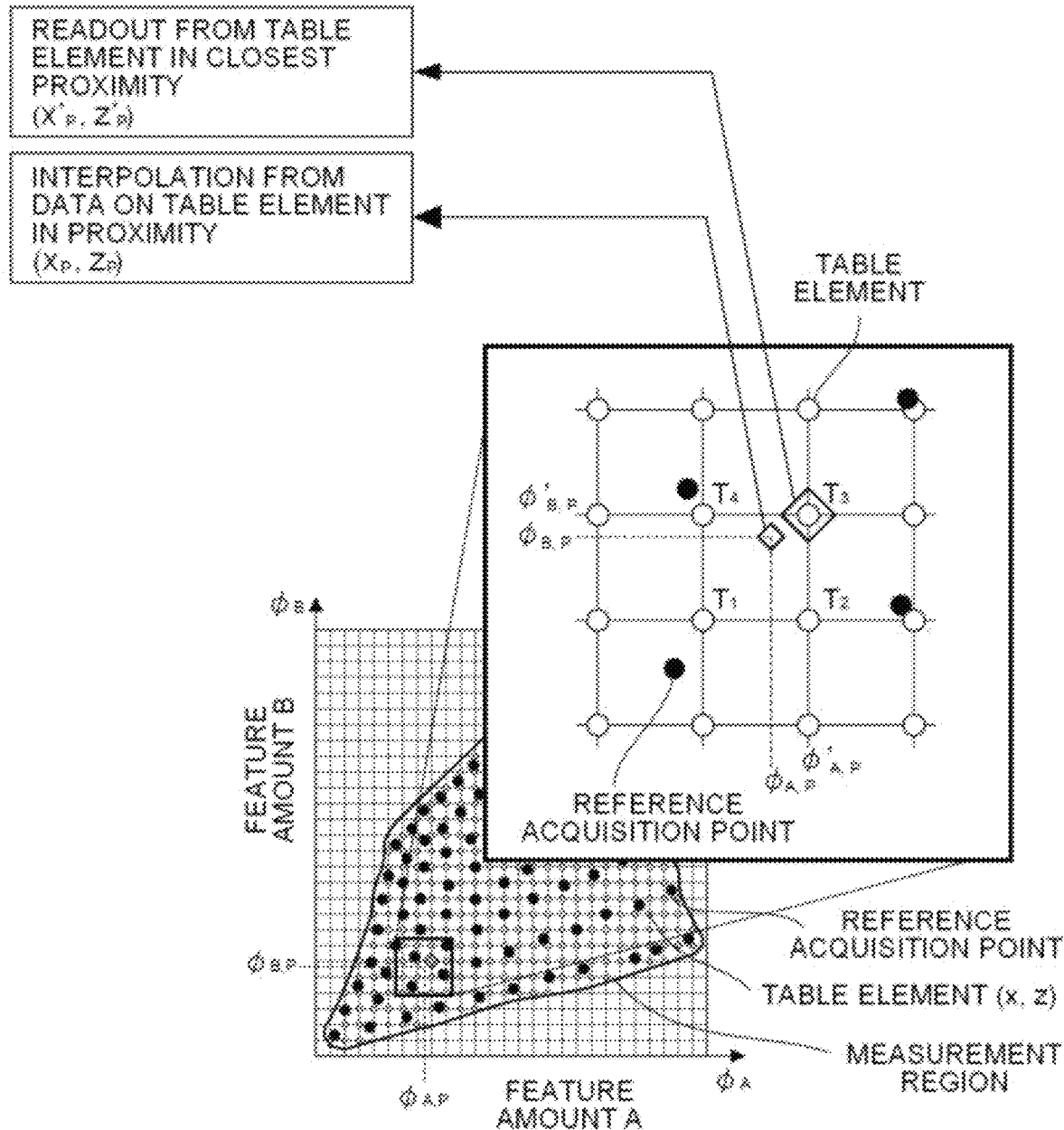
FIG. 14 is a diagram illustrating a procedure for reading coordinates from the feature amount-coordinate table.

Next, a procedure for finding the space coordinates ($x_P$, $z_P$) of the point P from the set of feature amounts ($\varphi_{A, P}$, $\varphi_{B, P}$) that have been gained for the point P is described. As described above, the feature amount-coordinate table that has been created in advance as shown in FIG. 11 is used in order to read out the data stored in the table element $T_3$ ($\varphi'_{A, P}$, $\varphi'_{B, P}$) that is the closest to the set of feature amounts ($\varphi_{A, P}$, $\varphi_{B, P}$) as shown in FIG. 14, and thus, ($x'_P$, $z'_P$) can be found. In addition, the space coordinates ($x_P$, $z_P$) of the point P can also be calculated through interpolation on the basis of the data stored in a plurality of table elements ($T_1$, $T_2$, $T_3$ and $T_4$, for example) in the proximity of the set of feature amounts ($\varphi_{A, P}$, $\varphi_{B, P}$).

Figure 15:
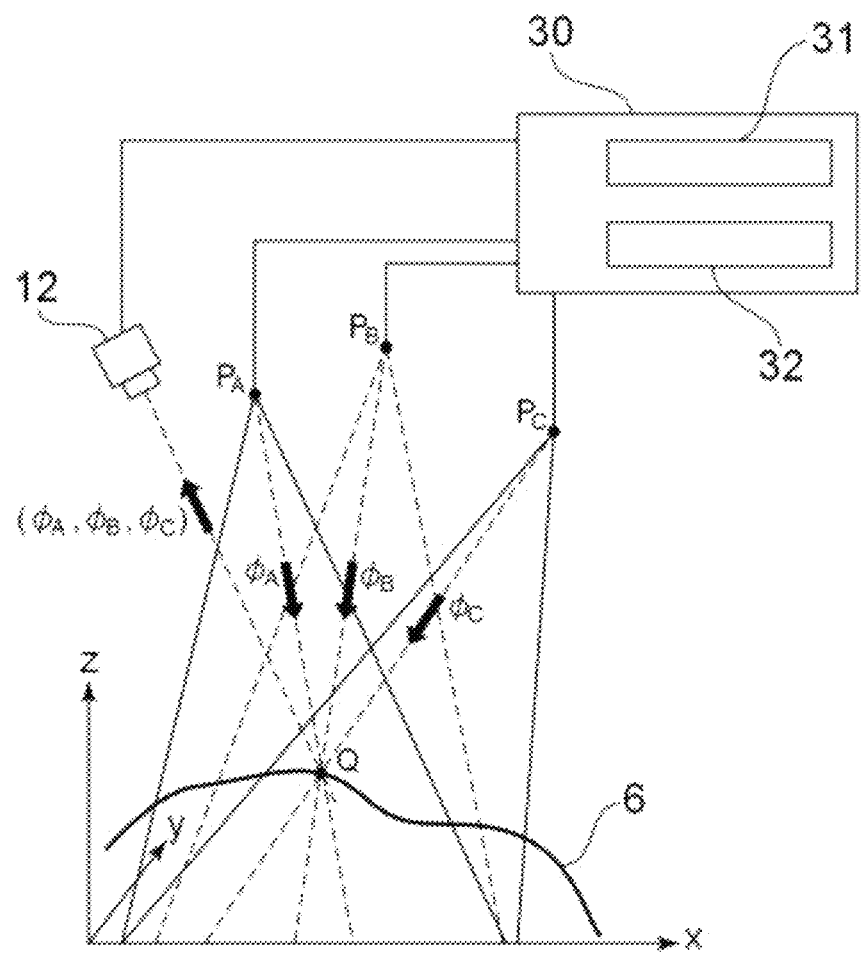
FIG. 15 is a diagram illustrating a method for acquiring three phase values from each point (each location) within the space to be measured according to the present invention.

In order to find the space coordinates (x, y, z) in the three-dimensional space, it is necessary to expand the above-described two-dimensional space into the three-dimensional space. FIG. 15 is a diagram illustrating a method for acquiring three phase values for each point (each location) within the space to be measured according to the present invention.

As shown in FIG. 15, three projectors PA, PB and PC are arranged in different locations, and the direction of the fringe to be projected is adjusted so that each point (each location) within the space to be measured can be provided with three phase values that have been made to continue (corresponding to "the feature amounts" in the above description). Even in the case where two projectors from among the three projectors are arranged in the same location, measurement is possible when the direction or the pitch of the fringe to be projected is different. In a nutshell, an appropriate combination of the arrangements of the three projectors, the direction and the pitch of the fringe to be projected, and the like may be provided in order to achieve the relationship of one-on-one correspondence between the three phase values and the three-dimensional coordinates within the measurement region or a partial measurement region. By doing this, this combination and the three-dimensional coordinates are in the relationship of one-on-one correspondence, and therefore, it is possible to show the data in a table for the three-dimensional coordinates in the same manner as in the case of the two-dimensional coordinates. The relationship of the correspondence between the three phase values that have been made to continue and the three-dimensional coordinates is shown in a table in advance.

In the case where an image of the object 6 that is an object to be measured arranged within the space to be measured is taken by the camera 12, three phase values are gained for each point. In addition, in the case of three-dimensional measurement of the object, the three-dimensional coordinate values can be gained from the three or more phase values that have been gained from the image taken by the camera 12 by referring to the above-described table.

As described above, the relationship between the three phase values and the three-dimensional coordinate values is shown in a table so that the three-dimensional coordinate values can be found instantly, and the coordinates can be gained without including a systematic error and with high precision. According to this method, the three-dimensional coordinate values can be gained irrelevant of the location of the camera 12. As described below, the locations of the camera or a lens may vary, and zooming or the focus adjustment are also possible. A three-dimensional measurement device with which an image of the object to be measured can be enlarged through zooming or can be taken by using autofocus after the installation of the measurement device has not existed so far, and thus, the device is revolutionary, and a wide scope of application can be expected.

The respective light sources provided in the projectors PA, PB and PC operate in accordance with the control program equipped within the computer 30. The camera 12 takes an image of the fringe pattern that has been projected onto the object 6 and sends the information on the image that has been taken to the computer 30. The computer 30 uses the table where the three phase values (feature amounts) stored in a memory means 31 are related to the three-dimensional coordinate values so as to find the three-dimensional coordinate values of each point on the surface of the object 6. In addition, the three-dimensional coordinate values that have been found are used so that a three-dimensional image can be displayed on the display screen of a display device, not shown, equipped with the computer 30. Here, in the case where the method for acquiring table data according to the present invention is implemented, the computer 30 is used to operate the program for acquiring table data, and thus, the table data showing the relationship between the feature amounts and the three-dimensional coordinate values is acquired. The program may be stored in a storage medium 32, or the program may be operated in the cloud by connecting the computer 30 to a communication line such as the Internet, not shown.

In addition, the arithmetic operation process or the storage process that are carried out by the computer 30, the memory means 31 or the memory medium 32 may be partially carried out by operating a processing unit such as another computer, not shown, through the connection to a communication line such as the Internet.

According to the present invention, the entire system needs only one table irrelevant of the number of cameras or the number of pixels of the cameras. Therefore, an increase in the number of pixels of the camera does not necessarily lead to an increase in the memory capacity for the table. In addition, the capacity of the table does not increase even in the case where a plurality of cameras is arranged.

Figure 16:
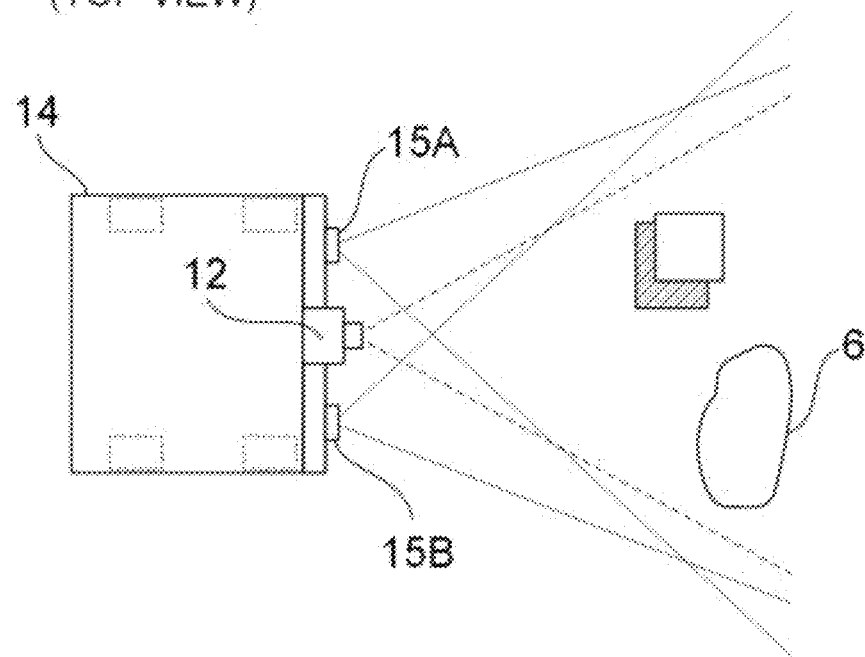
FIG. 16 is a diagram illustrating an example where the measurement device according to an embodiment of the present invention is equipped in a moving robot.
Figure 16:
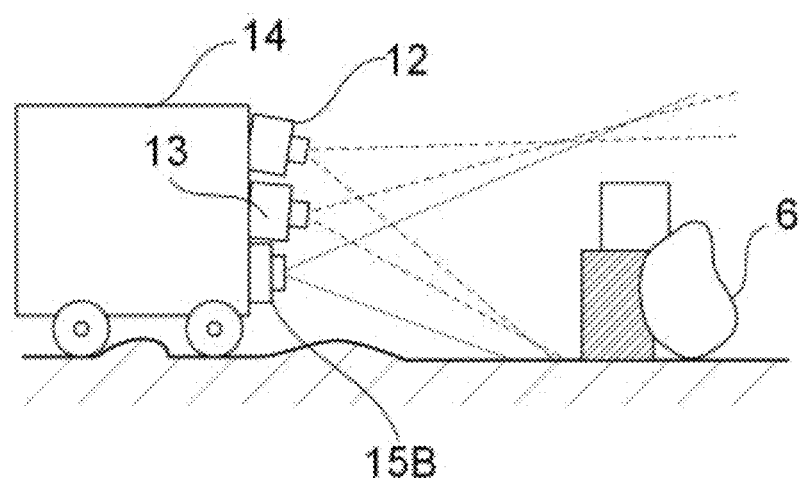

In the case where the device is mounted on the moving robot 14 as shown in FIG. 16 and the locations of the camera or a lens has shifted due to the vibration in a site of which the road condition is not good, for example, the use of the present technique makes three-dimensional measurement with high precision possible. The moving robot 14 that has wheels as a traveling means is equipped with cameras 12 and 13 in the upper and lower portions, and fringe projection units 15A and 15B that make fringe projection in the two directions, longitudinal and lateral directions, possible.

The measurement method according to the present invention can be applied not only to the fringe projection method, but also to the space coding method and the light cutting method. In the case of the space coding method, project paths are installed in three directions, and patterns with two values are projected a plurality of times so that the space is divided. Three codes are gained from the respective projector, and therefore, the relationship of the correspondence between these three codes and the space coordinates can be established.

In the case of the light cutting method, three light sources such as lasers for emitting light through a slit are provided. Three moving amounts of light that has passed through a slit are gained from the respective light sources, and therefore, the relationship of correspondence between the values that represent these three moving amounts and the space coordinates can be established.

In the case where only a two-dimensional space is targeted as described above, at least two projectors are necessary. It is possible to gain two components of the coordinate values from three values even when there are three or more projectors. In the case where a three-dimensional space is targeted as described above, at least three projectors are necessary. It is possible to gain three components of the coordinate values from four or more values even when there are four or more projectors.

Figure 17:
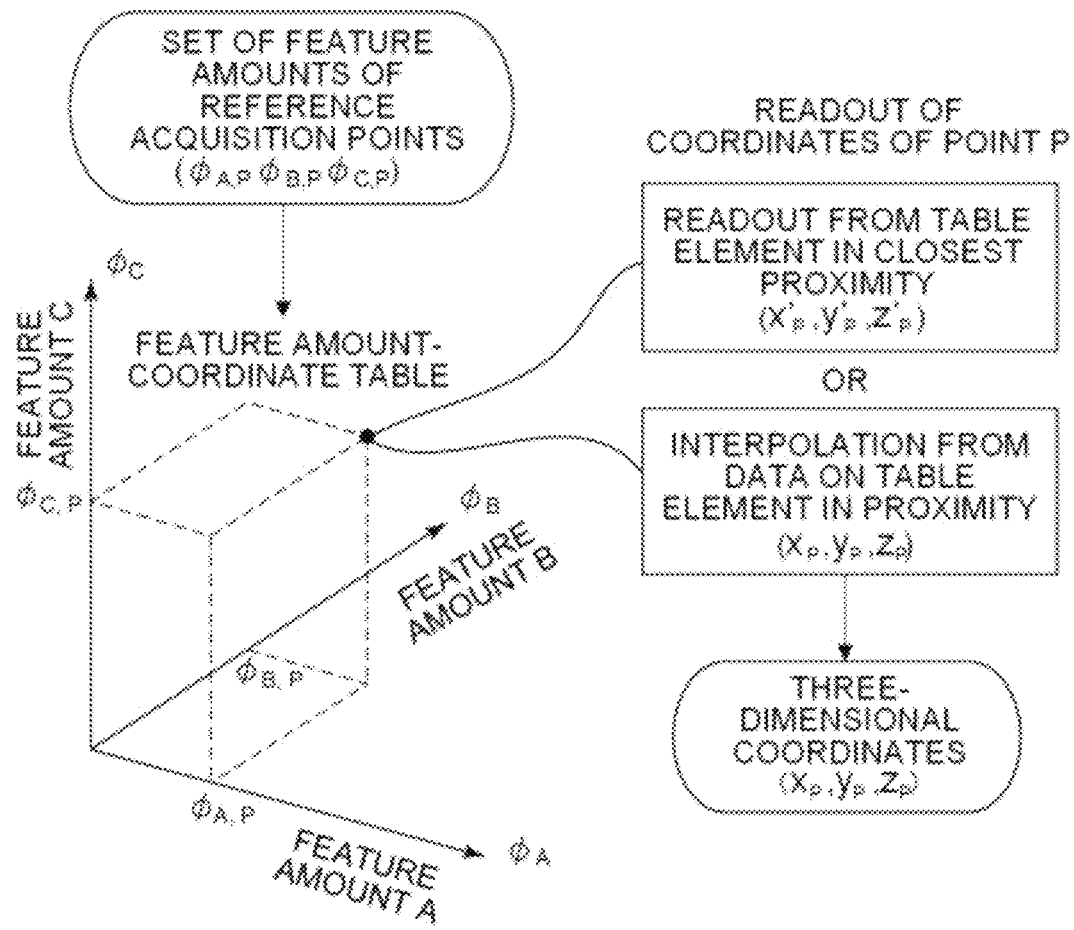
FIG. 17 is a diagram illustrating a procedure for reading three-dimensional coordinates from the feature amount-coordinate table.

FIG. 17 is a diagram illustrating a procedure for creating a feature amount-coordinate table by gaining three or more feature amounts from the projectors of which the number is three or greater, and reading the coordinates by using the feature amount-coordinate table.

In this case as well, $(x'_P, y'_P, z'_P)$ can be found as the space coordinates of the point P from the table elements that are closest to the set of the feature amounts $(\varphi_{A, P}, \varphi_{B, P}, \varphi_{C, P})$ that have been gained for the point P, and $(x_P, y_P, z_P)$ can be found on the basis of the data stored as a plurality of table elements in the proximity of the set of the feature amounts through interpolation in the same manner as in the case in FIG. 14.

Figure 18:
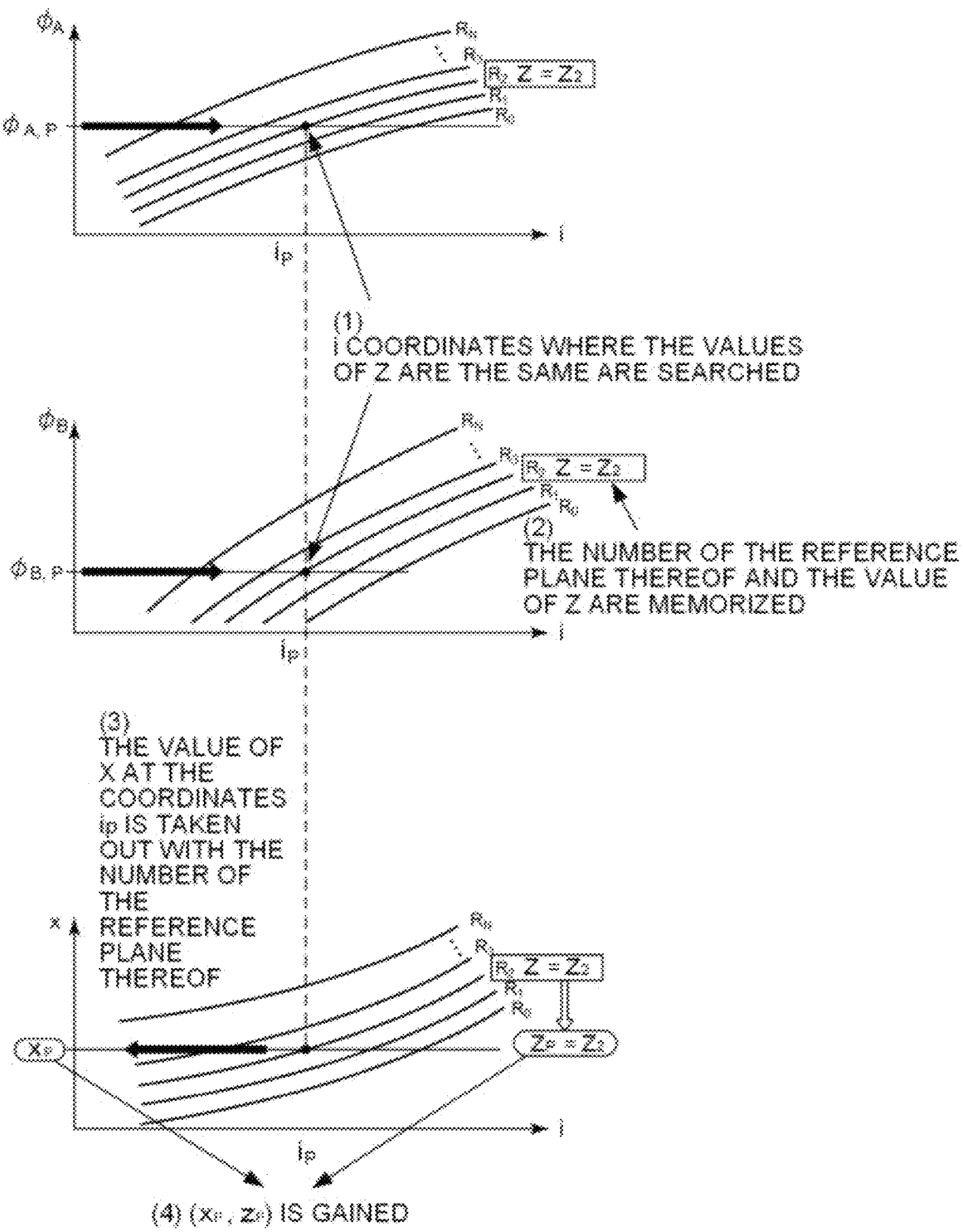
FIG. 18 is a diagram illustrating a procedure for finding coordinates through a search.

In addition, there is a technique for finding coordinates through searching without creating a feature amount-coordinate table. FIG. 18 shows a procedure for that. FIG. 18 includes a graph A, a graph B and a graph X from the top to the bottom, where the respective graphs show the feature amount A (A) and the feature amount B (B) that correspond to the pixel numbers (i coordinates) in the lateral direction of the image taken by the camera 1 as well as the distribution of the x coordinates gained from the reference plane 7.

In addition, the graphs A, B and X all schematically show the plotting of the values that are gained by moving the reference plane 7 to the locations $R_0, R_1, \ldots R_N$ ($z=z_0, z_1, \ldots z_N$, respectively). These values continuously and monotonously vary along the reference plane 7, and therefore are gained in a smooth curved form for each location of the reference plane 7.

First, in the graphs A and B, i coordinates where the values of z become the same in both graphs A and B or i coordinates where the values of z become close are searched from the set of feature amounts $(\varphi_{A, P}, \varphi_{B, P})$ that are gained for the point P on the object.

There must be one point in the graphs A and B of which the i coordinate and the z coordinate are the same as those of the point P that is on the object. Here, the locations in which the reference plane 7 is installed are discrete, and therefore, the identical point is not necessarily found. In this case, an approximate point may be found when the intervals at which the reference plane 7 is installed are small, or such a point can be calculated through interpolation.

FIG. 18 shows a case where such a point can be searched on the reference plane 7. The number of reference planes 7 and the z coordinate and i coordinate thereof that have been searched and found in the above-described manner are memorized. Here, the number of reference planes 7 is two, the z coordinate is $z_2$, and the i coordinate is $i_P$. Next, in the graph X, the value of the x coordinate $x_P$ can be read from the number 2 of the reference plane 7 thereof and the i coordinate $i_P$. In addition, the z coordinate is $z_2$, and therefore, $(x_P, z_P)$ can be gained in accordance with this procedure.

This way of finding the coordinates through searching can also be expanded to the three-dimensional coordinates. In FIG. 18, the lateral axis is the i coordinate, and the graphs A, B and X are feature amounts that correspond to the i coordinates, respectively. In the case where this is expanded to the three-dimensional coordinates, graphs for the feature amounts A $(\varphi_A)$, B $(\varphi_B)$ and C $(\varphi_C)$ that correspond to the coordinates (i, j) of the pixels in the camera 1 and the x coordinates and the y coordinates can be created. By doing this, the three-dimensional coordinates $(x_P, y_P, z_P)$ can be found in accordance with the same procedure.

By using the above-described method, three-dimensional measurement is possible without any calibration for the camera 2 with which three-dimensional measurement is carried out on an object. That is to say, the camera 2 may be moved to another location, or the focus of the lens may be adjusted or the zooming may be adjusted. The temperature may change due to a factor inside the camera such as the generation of heat, which may cause deformation inside the camera, and thus, the location from which an image is taken may microscopically shift; however, this does not affect the measurement.

The amount of flexion of a lens or inside the camera may microscopically change depending on the direction of the camera because the direction of the gravity applied to the camera changes; however, this does not affect the measurement. In general, a lens is attached to a movable portion such as a focus adjusting mechanism or a zooming mechanism which includes a small amount of shaking or unsteadiness, which may cause microscopic deformation due to the vibrations or the direction of the gravity. This has lowered the measurement precision in the conventional three-dimensional measurement device; however, this does not affect the measurement device in the case where the method according to the present invention is used.

Here, in the present description, the above-described technique for finding space coordinates on the basis of the relationship of correspondence between the plurality of feature amounts and the space coordinates is referred to as "feature amount type total space measurement technique," and the technique for finding the space coordinates by showing this relationship of correspondence in a table is referred to as "technique for showing the feature amount type total space in a table."

1.4 Example of Configuration of Device

Figure 19:
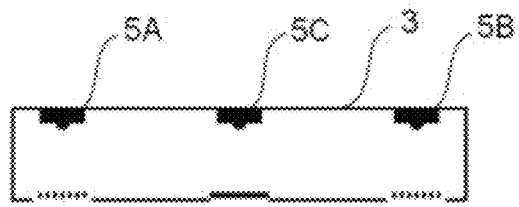
FIG. 19 is a diagram illustrating an example of the configuration of the device.
Figure 19:
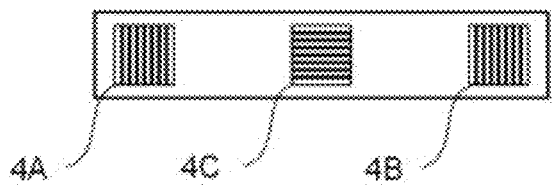
Figure 19:

In the following, an example of the configuration of the device is shown. FIG. 19 shows the state where fringe projection units for projecting a fringe in the lateral direction are attached to the left and the right, and a fringe projection unit for projecting a fringe in the lateral direction is attached in the center portion. This allows a set of a plurality of feature amounts to be quickly gained within the measurement region or a partial region thereof.

Grating glass 4A and grating glass 4B are attached to the left and the right of the fringe projection unit 3, and grating glass 4C is attached in the center portion. Light sources 5A, 5B and 5C are provided in the fringe projection unit 3 so as to correspond to each sheet of grating glass 4A, 4B and 4C. It is desirable for the sheets of grating glass 4A, 4B and 4C to be arranged in such a manner that the direction of all the fringes are different.

Figure 20:
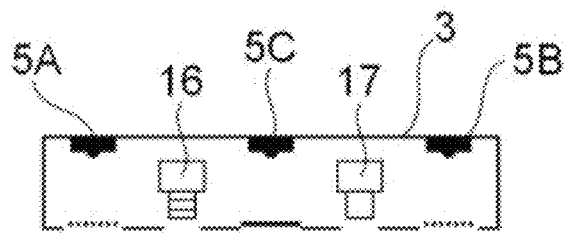
FIG. 20 is a diagram illustrating another example of the configuration of the device.
Figure 20:
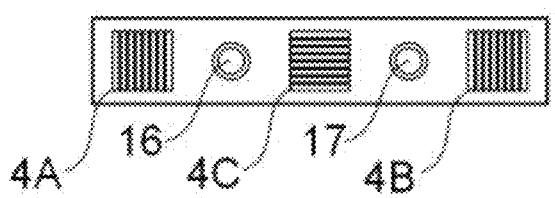
Figure 20:
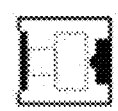

FIG. 20 shows the state where cameras are built-in inside the device. The camera used for calibration and the camera used for measurement may be the same or different. The cameras are built in the device, and therefore, the entirety of the device can be miniaturized.

It is possible for a built-in camera to be equipped with a zoom lens. When a plurality of cameras is built in, one camera is equipped with a wide-angle lens for measuring a wide scope, and another camera is equipped with a zoom lens so that three-dimensional measurement in detail can be made partially possible. In addition, a camera may be equipped with a panning/tilting mechanism so that it can made possible to provide a three-dimensional measurement device with which a more detailed image of the necessary region can be taken. In the embodiment in FIG. 20, a camera 16 with a zoom lens and a camera 17 are built in.

Figure 21:
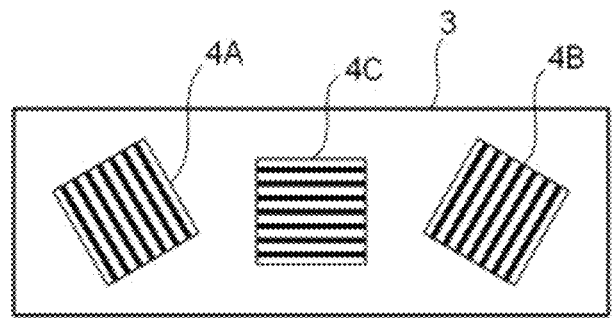
FIG. 21 is a diagram illustrating still another example of the configuration of the device.

FIG. 21 shows the device that can project fringes at any angle. Sheets of grating glass 4A, 4B and 4C are attached to a fringe projection unit 3. In accordance with the measurement technique according to the present invention, three-dimensional measurement is possible as long as the arrangement allows a set of a plurality of feature amounts to be uniquely gained within the measurement region or a partial region thereof even when the projection fringes are attached in any direction as described above. In addition, a means that can specify which partial region is involved is necessary even when the arrangement allows a set of a plurality of feature amounts to be uniquely gained in a partial region of the measurement region. In the case where a set of feature amounts is uniquely determined in each partial region on the left side or the right side in the measurement region, for example, a means for clarifying whether the left side or the right side of the measurement region is involved is separately necessary. The same can be applied to a case where there are many partial regions as such. In the case where phase distributions that are not phase connected (phase distributions where 2· is repeated) are used as the feature amounts, it is assumed that the measurement region includes a plurality of points at which the set of feature amounts becomes the same. In such a case, a means for determining which partial region is the region to be found is separately necessary.

Figure 22:
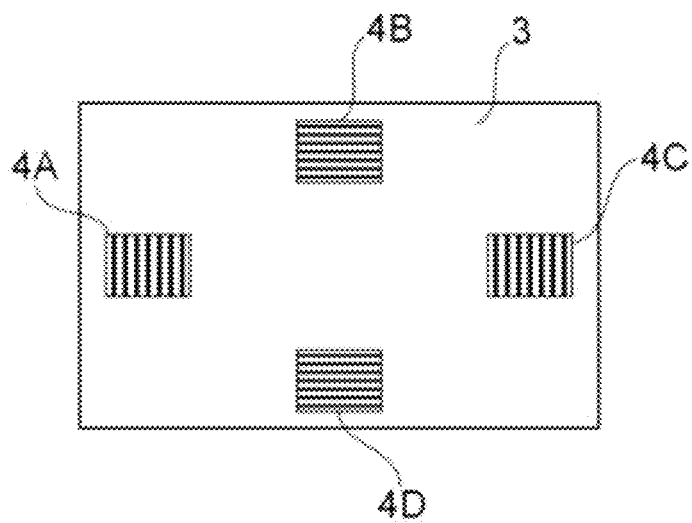
FIG. 22 is a diagram illustrating yet another example of the configuration of the device.

FIG. 22 shows a case where there are four portions for projecting a fringe that include sheets of grating glass 4A, 4B, 4C and 4D. Even in the case where four or more fringe patterns are projected, three-dimensional measurement is possible as long as the arrangement allows a set of a plurality of feature amounts to be uniquely gained within the measurement region or a partial region thereof.

Figure 23:
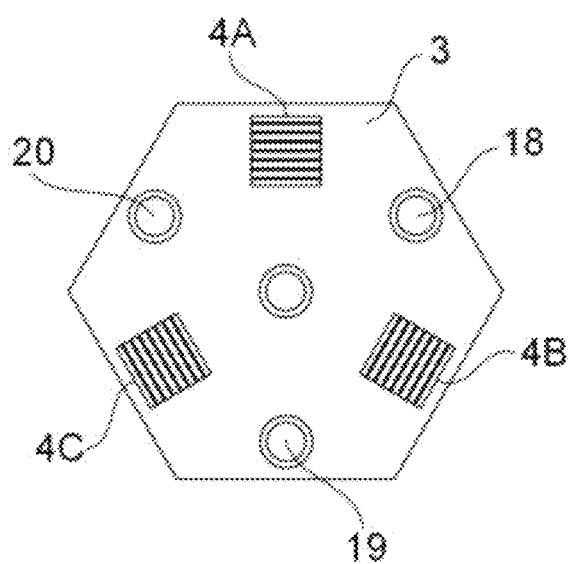
FIG. 23 is a diagram illustrating another example of the configuration of the device.

FIG. 23 shows a case where fringes are projected in any direction by using sheets of grating glass 4A, 4B and 4C, and furthermore, a plurality of cameras 18, 19 and 20 are built in. It is possible for the plurality of cameras to have different functions in such a manner that taking a wide-angle image, zooming, adjusting the focus, and a panning/tilting mechanism are provided in the respective cameras. In addition, the measurement results with lowered noise can be gained by synthesizing the distribution of the space coordinates that have been gained by taking images with a plurality of cameras.

In another embodiment of the present invention, different wavelengths are selected for the light sources in the fringe projection units so that fringe patterns can be projected at the same time because images can be taken separately by the image taking side. That is to say, it becomes possible to find the space coordinates from an image that has been taken once. By doing this, three-dimensional measurement is possible even in a state where the device is shaking. For example, three-dimensional measurement with high precision is possible even when the device is held in the hand. In addition, three-dimensional measurement with high precision is possible even when the device is mounted on a drone or the like, and therefore, it is possible to apply the device for the inspection of an infrastructure.

Furthermore, projectors that can project fringe patterns in two directions such as a liquid crystal projector can be used as the fringe projection unit. In such a case, two feature amounts can be gained with one projection unit. Therefore, at least two fringe projection units are necessary in order to find three-dimensional space coordinates in the case where such a projection unit is used.

Though the embodiments according to the present invention are described above, the present invention is not limited to these embodiments, and the invention can be implemented in other embodiments by applying an appropriate modification so as to provide the following effects.

(1) Three-dimensional coordinate values can be found instantly, and thus, the coordinates can be gained with high precision without including a systematic error.

(2) Three-dimensional coordinate value can be gained irrelevant of the location of a camera. That is to say, the location of the camera or a lens may shift, which makes zooming or adjusting the focus possible. It is not necessary to increase the table even when a plurality of cameras is used.

(3) Only the portion for projecting a fringe may be made firm as an anti-vibration measure even when the device is used in a vibrating environment.

2. Experiment Example

Figure 24:
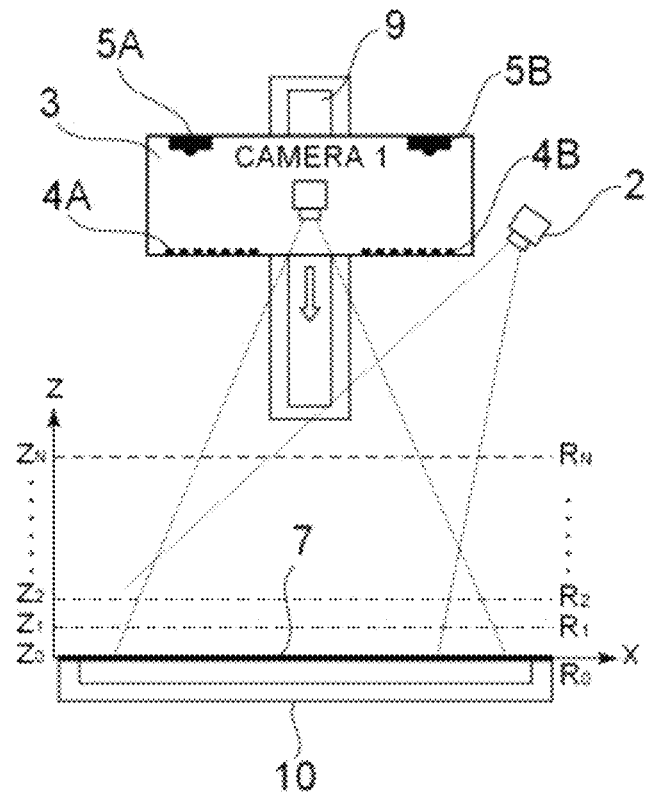
FIG. 24 is a diagram illustrating an example of the configuration of an experimental device.

In the following, an experiment example of the feature amount type total space measurement technique is described. In this experiment, for the purpose of simplicity, two feature amounts were used to find the (x, z) coordinates. FIG. 24 shows the arrangement of two projectors, a reference plane 7, an object to be measured, a camera 1 which is a camera for creating a table, and a camera 2 which is a camera for measurement.

A power source 5A with grating glass 4A and a light source 5B with grating glass 4B were fixed to a fringe projection unit 3. The light source 5A with grating glass 4A functioned as a projector. As a result, a fringe A and a fringe B could be respectively projected onto the reference plane 7 and the object to be measured. In addition, the camera 1 was fixed within a fringe projection unit 3. The fringe projection unit 3 was attached to a linear stage so as to be able to translate in the direction of the normal of the reference plane 7 by an arbitrary amount.

The reference plane 7 was provided on the surface of a liquid crystal monitor 10 to which a light diffusing plate was pasted. The liquid crystal monitor 10 displayed a fringe pattern in the x direction, and an image thereof was taken by the camera 1 so that the x coordinate values on the reference plane 7 could be found for each pixel for taking an image. In addition, the x coordinate values, the z coordinate values, the phase value $\varphi_A$ of the fringe A and the phase value (PB of the fringe B could be gained for each pixel for taking an image of the reference plane 7 by projecting the fringe A and the fringe B.

In this experiment, the reference plane 7 was moved from z=0 mm to z=90 mm at 10 mm intervals, and in each location thereof, the phase values of the projected fringe were analyzed, the fringe in the x direction was displayed on the liquid crystal monitor, and an image was taken. The sampling moire method was used for the topological analysis of the projected fringe, and a process of phase connection was carried out on the gained phase distribution, and thus, the phase value $\varphi_A$ of the fringe pattern 8A and the phase value $\varphi_B$ of the fringe pattern 8B were found for each pixel. In addition, the phase shift method was used for the topological analysis of the fringe in the x direction that was displayed on the reference plane 7.

In the case of this experiment, the reference plane 7 was not moved, and instead, the fringe projection unit 3 was moved in order to provide the state where the reference plane 7 moved relatively. The locations $R_0, R_1, \ldots R_N$ of the reference plane 7 shown in FIG. 24 are locations relative to the fringe projection unit 3.

Figure 25:
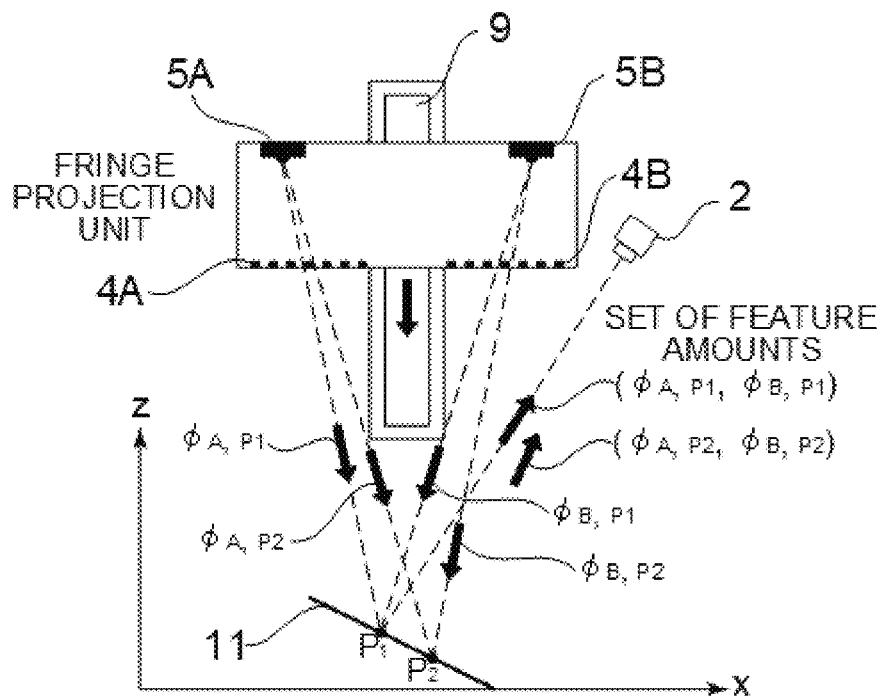
FIG. 25 is a diagram illustrating an example of the measurement of an object.

Next, as shown in FIG. 25, a white plate 11 was used as an object to be measured, which was installed at an angle of 30 degrees inclined relative to the X axis. Two points $P_1$ and $P_2$ were marked with a gap of 40 mm on the white plate 11. A fringe pattern 8A was projected onto the object on which an image was taken by the camera 2. The phase distribution was found from the gained image in accordance with the sampling moire method followed by the phase connection, and thus, the phase values $\varphi_{A, P1}$ at the points $P_1$ and $P_2$ and the phase values $\varphi_{B, P1}$ of the fringe pattern 8B were respectively found. Likewise, the phase values $\varphi_{A, P2}$ at the points $P_1$ and $P_2$ and the phase values $\varphi_{B, P2}$ of the fringe pattern 8B were found by projecting the fringe pattern 8B onto the object. These phase values were used as the feature amounts.

As the results of the experiment, the phase values $\varphi_{A, P1}$ and $\varphi_{B, P1}$ at the point $P_1$ were −31.49 rad and −35.44 rad, respectively. In addition, the phase values $\varphi_{A, P2}$ and $\varphi_{B, P2}$ at the point $P_2$ were −47.66 rad and −53.64 rad, respectively. On the basis of these feature amounts, the (x, z) coordinates were found to be (61.0 mm, 50.0 mm) at the point $P_1$ and (96.1 mm, 30.0 mm) at the point $P_2$. The distance between these two points was found from the gained coordinate values to be 40.4 mm, and thus, it could be seen that there was a distance between the two points. In this experiment, a technique for finding coordinates through searching without creating a feature amount-coordinate table that was described in reference to FIG. 18 was used.

This application was filed claiming priority on the basis of the Japanese Patent Application 2017-092144 filed on May 8, 2017, the entire disclosure of which is incorporated herein.

The invention claimed is:

1. A measurement method for finding the space coordinates of a surface of an object to be measured, comprising:
    preparing a plurality of sets of three or more feature amounts and projecting a pattern or a change in the pattern onto a surface of an object to be measured from three or more projectors that are arranged in three or more different locations and in such a manner that a relationship of a one-on-one correspondence is achieved between the respective sets of three or more feature amounts and the respective space coordinates within a measurement region or within a partial region of the measurement region;
    taking an image of the pattern or the change in the pattern that has been projected onto the surface of the object to be measured with one camera, the image including the sets of three or more feature amounts comprising three or more phase values; and
    using the relationship between the sets of three or more feature amounts and the space coordinates that has been found in advance by using a reference object in order to find the space coordinates from the sets of three or more feature amounts that have been gained on the basis of the image that has been taken.

2. The measurement method according to claim 1, wherein the relationship between the respective sets of three or more feature amounts and the respective space coordinates is shown in a table so that the space coordinates of the surface of the object to be measured can be found on the basis of the values shown in the table at the time of measurement of the space coordinates of the surface of the object to be measured.

3. The measurement method according to claim 1, wherein part of the relationship between the respective sets of three or more feature amounts and the respective space coordinates is shown in a table so that the space coordinates of the surface of the object to be measured can be found through interpolation by using the values shown in the table at the time of measurement of the space coordinates of the surface of the object to be measured.

4. The measurement method according to claim 1, wherein the space coordinates of the surface of the object to be measured are found from the sets of a plurality of feature amounts that are simultaneously obtained by using a plurality of wavelengths of light for the projection from the three or more locations.

5. The measurement method according to claim 1, wherein the space coordinates of the surface of the object to be measured are found through the projection from the three or more locations that are arranged along a line.

6. A method for finding the relationship between sets of three or more feature amounts and respective space coordinates, wherein the relationship between the sets of three or more feature amounts and the respective space coordinates in the measurement method according to claim 1 is found by projecting a pattern or a change in the pattern onto the surface of the reference object from a plurality of locations while changing the distances between the plurality of locations and the reference object with a plurality of intervals.

7. A method for finding the relationship between sets of three or more feature amounts and respective space coordinates comprising:
- preparing a plurality of sets of three or more feature amounts and projecting a pattern or a change in the pattern onto the surface of the reference object from three or more projectors that are arranged in three or more different locations and in such a manner that a relationship of a one-on-one correspondence is achieved between the respective sets of three or more feature amounts and the respective space coordinates within a measurement region or within a partial region of the measurement region while changing the distances between the plurality of locations and the reference object with a plurality of intervals; and
- taking an image of the pattern or the change in the pattern that has been projected onto the surface of the object to be measured with one camera, the image including the sets of three or more feature amounts comprising three or more phase values.

8. The method for finding the relationship between sets of three or more feature amounts and respective space coordinates according to claim 6, wherein a fringe pattern or a mark is fixed on the surface of the reference object.

9. The method for finding the relationship between sets of three or more feature amounts and respective space coordinates according to claim 6, wherein a plurality of wavelengths of light is used for the projection from the three or more locations.

10. The method for finding the relationship between sets of three or more feature amounts and respective space coordinates according to claim 6, characterized in that the three or more locations are arranged along a line.

11. A measurement device for finding the space coordinates of a surface of an object to be measured, comprising:
- three or more projectors arranged in three or more different locations and that include a plurality of sets of three or more feature amounts and are configured to project a pattern or a change in the pattern onto a surface of an object to be measured from the three or more different locations and that are arranged in such a manner that a relationship of a one-on-one correspondence is achieved between the respective sets of three or more feature amounts and the respective space coordinates within a measurement region or within a partial region of the measurement region;
- one camera configured to take an image of the pattern or the change in the pattern that has been projected onto the surface of the object to be measured, the image including the sets of three or more feature amounts comprising three or more phase values;
- a memory configured to store the relationship between the sets of three or more feature amounts and the respective space coordinates; and
- a computer configured to use the relationship between the sets of three or more feature amounts and the respective space coordinates that has been stored in the memory unit in order to find the space coordinates from the sets of three or more feature amounts that have been gained on the basis of the image that has been taken.

12. The measurement device according to claim 11, wherein the relationship between the respective sets of three or more feature amounts and the respective space coordinates is shown in a table, which is thus stored in the memory, so that the space coordinates of the surface of the object to be measured can be found on the basis of the values shown in the table at the time of measurement of the space coordinates of the surface of the object to be measured.

13. The measurement device according to claim 11, wherein part of the relationship between the respective sets of three or more feature amounts and the respective space coordinates is shown in a table, which is thus stored in the memory, so that the space coordinates of the surface of the object to be measured can be found through interpolation by using the values shown in the table at the time of measurement of the space coordinates of the surface of the object to be measured.

14. The measurement device according to claim 11, wherein the sets of a plurality of feature amounts are simultaneously obtained by using different wavelengths of light for the projection from the three or more locations of the three or more projectors.

15. The measurement device according to claim 11, wherein the space coordinates of the surface of the object to be measured are found through the projection from the three or more locations that are arranged along a line.

16. The measurement device according to claim 11, wherein the measurement device is configured to find the relationship between the sets of three or more feature amounts and the respective space coordinates by projecting a pattern or a change in the pattern onto the surface of the reference object from a plurality of locations of a first projector of the three projectors while changing the distances between the first projector and the reference object with a plurality of intervals.

17. The measurement device according to claim 16, wherein the measurement device is configured to find the relationship between the sets of three or more feature amounts and the respective space coordinates by using a second projector of the three projectors having the same configuration as the first projector and projecting a pattern or a change in the pattern onto the surface of the reference object from the second projector while changing the distance between the second projector and the reference object with a plurality of intervals.

18. A measurement device, comprising:
- three or more projectors arranged in three or more different locations and that include a plurality of sets of three or more feature amounts and are configured to project a pattern or a change in the pattern from the three or more different locations and that are arranged in such a manner that a relationship of a one-on-one correspondence is achieved between the respective sets of three or more feature amounts and the respective space coordinates within the measurement region or within a partial region of the measurement region;
- a stage configured to change a distance between the three or more projectors and a reference object;
- a camera configured to take an image of the pattern or a change in the pattern while changing the distances between the three or more projectors and the reference object with a plurality of intervals, the image including the sets of three or more feature amounts comprising three or more phase values; and
- a computer configured to find the relationship between the sets of three or more feature amounts and the respective space coordinates on the basis of an image taken by the camera and the distances between the three or more projectors and the reference object.

19. The measurement device according to claim 17, wherein the relationship between the sets of three or more feature amounts and the space coordinates is found by fixing a fringe pattern or a mark on the surface of the reference object.

20. The measurement device according to claim 11, wherein the three or more projectors are integrated as a single projection module, and the camera includes a plurality of cameras in such a manner that the plurality of cameras is provided in the projection module.

\* \* \* \* \*